United States Patent
Knoll

(10) Patent No.: US 7,074,019 B2
(45) Date of Patent: Jul. 11, 2006

(54) ROTOR PROTECTOR FOR WET-TYPE ROTOR PUMP

(75) Inventor: Andreas Knoll, Dortmund (DE)

(73) Assignee: Pierburg GmbH, Neuss (DE)

( * ) Notice: Subject to any disclaimer, the term of this patent is extended or adjusted under 35 U.S.C. 154(b) by 224 days.

(21) Appl. No.: 10/271,225

(22) Filed: Oct. 15, 2002

(65) Prior Publication Data

US 2003/0077191 A1    Apr. 24, 2003

(30) Foreign Application Priority Data

Oct. 24, 2001    (DE) ................................ 101 52 497

(51) Int. Cl.
*F04B 17/03*    (2006.01)

(52) U.S. Cl. ............................ 417/423.14; 417/423.7; 417/423.1; 123/41.44

(58) Field of Classification Search ........ 417/348–351, 417/357, 423.7, 423.14, 423.3, 366, 310; 123/41.44; 415/200; 310/87, 63

See application file for complete search history.

(56) References Cited

U.S. PATENT DOCUMENTS

| | | | |
|---|---|---|---|
| 2,649,049 A | | 8/1953 | Pezzillo et al. |
| 4,878,804 A | * | 11/1989 | Akerman et al. ............ 415/111 |
| 5,129,795 A | * | 7/1992 | Hyland .................. 417/423.12 |
| 5,218,256 A | * | 6/1993 | Umezawa et al. ............ 310/90 |
| 5,785,013 A | | 7/1998 | Sinn et al. ............... 123/41.44 |
| 5,831,364 A | | 11/1998 | Buse |
| 6,036,456 A | * | 3/2000 | Peters et al. ............. 417/423.3 |
| 6,068,455 A | * | 5/2000 | Cowans ...................... 417/366 |
| 6,069,421 A | * | 5/2000 | Smith et al. .................. 310/43 |
| 6,144,130 A | * | 11/2000 | Kawamura ............ 310/156.28 |
| 6,158,984 A | * | 12/2000 | Cao et al. ................. 417/423.1 |
| 6,229,240 B1 | * | 5/2001 | Kech et al. ................. 310/194 |
| 6,293,769 B1 | * | 9/2001 | Radermacher et al. ...... 417/357 |
| 6,350,105 B1 | * | 2/2002 | Kobayashi et al. ........ 417/44.1 |
| 6,445,098 B1 | * | 9/2002 | Materne ...................... 310/89 |
| 2004/0061395 A1 | | 4/2004 | Abordi et al. |

FOREIGN PATENT DOCUMENTS

| | | | |
|---|---|---|---|
| DE | 19543541 | | 11/1996 |
| GB | 987265 | | 3/1965 |
| JP | 06-284611 | * | 10/1994 |
| JP | 09-014174 | * | 1/1997 |
| JP | 11-013681 | * | 1/1999 |
| JP | 11013682 A | * | 1/1999 |
| WO | WO 02/45246 | | 6/2002 |

OTHER PUBLICATIONS

European Search Report dated Dec. 21, 2004 for corresponding EP Application No. EP02022608.

* cited by examiner

*Primary Examiner*—Charles G. Freay
*Assistant Examiner*—Emmanuel Sayoc
(74) *Attorney, Agent, or Firm*—Ohlandt Greeley, Ruggiero & Perle, L.L.P.

(57) ABSTRACT

A wet rotor-type pump, in particular used for pumping a coolant in vehicle motors, comprises a pump impeller for feeding a fluid and a motor rotor connected with the pump impeller. In wet rotor-type pumps the motor rotor is cooled by the fluid to be pumped.

3 Claims, 2 Drawing Sheets

ROTOR PROTECTOR FOR WET-TYPE ROTOR PUMP

BACKGROUND OF THE INVENTION

The invention relates to a wet rotor-type pump, i. e. a pump and motor unit e. g. comprising a centrifugal pump and an electric-direct-current motor. Such wet rotor-type pumps are in particular suitable for pumping cooling medium in vehicle motors.

From DE 195 45 561 a wet rotor-type pump having a pump impeller is known, which pump impeller takes in a liquid or gaseous fluid through an intake duct and feeds it towards a discharge duct. The pump impeller is mounted on a shaft. Said shaft also carries a rotor of a motor. For cooling the motor and any electronical components, the fluid flowing around the motor rotor is used. For feeding electrically conducting liquids, the motor rotor is surrounded by a slotted pot. The stator package of the motor with the windings is arranged outside the slotted pot which is preferably made of plastic material. The slotted pot, which is provided with a slot extending between the motor rotor and the inside of the pot and through which a fluid can flow, ensures sealing of the motor rotor towards the surroundings. Wet rotor-type pumps used for pumping liquids which are not electrically conducting, e. g. gasoline, do not comprise a slotted pot since sealing towards the stator package and the windings is not necessary.

Motor rotors, which generally comprise a plurality of solenoids and a rotor body, i. e. a carrier body for the solenoids, must be fluid-cooled and thus protected against corrosion. This is in particular required when water or coolants are pumped since these are strongly corrosive media. It common practice to surround the motor rotor, which is pressed on the common shaft, with a shell of high-grade steel acting as a protective means. For this purpose, a cylindrical shell of high-grade steel is pushed over the motor rotor and closed with two caps of high-grade steel. The high-grade steel shell and the caps as well as the caps and the shaft are welded to each other. This forms a seal for the motor rotor. This type of sealing is a very complex process, in particular in the case of large-scale production.

SUMMARY OF THE INVENTION

It is an object of the invention to protect the motor rotor of the wet rotor-type pump in a simple manner against corrosion.

The wet rotor-type pump according to the invention comprises a pump impeller for feeding a fluid, and a motor rotor connected with said pump impeller, wherein the motor rotor is cooled by a fluid. The motor rotor comprises a plurality of solenoids which may be carried by a rotor body, i. e. a carrier body. According to the invention a protective means surrounding the motor rotor and sealing the latter towards the fluid comprises a ring-shaped hollow space for receiving the motor rotor. Said ring-shaped hollow space can e. g. be produced by casting-in or enmolding the motor rotor with plastic material. Preferably, the protective means is a pot-like means which can in particular be prefabricated. Into the pot-like means, which in the case of a circular ring-shaped motor rotor preferably comprises two concentric cylinders, the motor rotor can be pushed or inserted. The ring-shaped hollow space for receiving the motor rotor is formed between the two cylinders. The two circular ring-shaped cylinders are preferably closed on one side by a disk or a cover to form a pot-like protective means. The opposite side of the pot-like protective means is also sealingly closed after insertion of the motor rotor. The protective means defining a ring-shaped hollow space is one that can in particular be configured as a prefabricated injection-molded plastic part which, in a simple manner, prevents corrosion, in particular of the solenoids.

Preferably, the protective means comprises a through bore defined by the ring-shaped hollow space. Said bore can receive a bearing shaft which carries the motor rotor together with the protective means. Preferably, the pump impeller is also carried by the bearing shaft. For example, by pressing the protective means onto the bearing shaft a torque produced by the motor rotor can be transmitted to the bearing shaft and from there to the pump impeller. In a preferred embodiment the protective means is positively connected with the pump impeller such that it is not necessary to press the protective means onto the bearing shaft. For this purpose the protective means preferably comprises a toothing extending in longitudinal direction of the bearing shaft, with a further toothing arranged on the pump impeller or a cylindrical projection of the pump impeller meshing with said former toothing. It is thus possible to push the motor rotor, together with the pump impeller, onto the bearing shaft. Pressing of the protective means and/or the pump impeller onto the bearing shaft is not required since the transmission of force is essentially effected via the positive connection.

In a further preferred embodiment the pump impeller and the protective means are configured as a single piece. This single piece can in particular be an injection-molded plastic part. Despite the requirement for a complex mold, producing the protective means and the pump impeller as a single piece offers the advantage that the wet rotor-type pump is easier and more rapid to mount. Further, problems which may occur at the place of transmission of force between the protective means and the pump impeller are eliminated.

BRIEF DESCRIPTION OF THE DRAWINGS

Hereunder the invention is described in detail with reference to preferred embodiments in conjunction with the appended drawings, in which.

DESCRIPTION OF THE PREFERRED EMBODIMENTS

In the described embodiments the pump housings and the intake and discharge ducts of the pump are not shown for the sake of clarity. The housings carry the stator, which is not shown either, of the motor driving the pump. Further, the pump, which is a wet rotor-type pump, can be configured with or without a slotted pot, wherein provision of a slotted pot depends on the fluid to be pumped.

Figure 1:
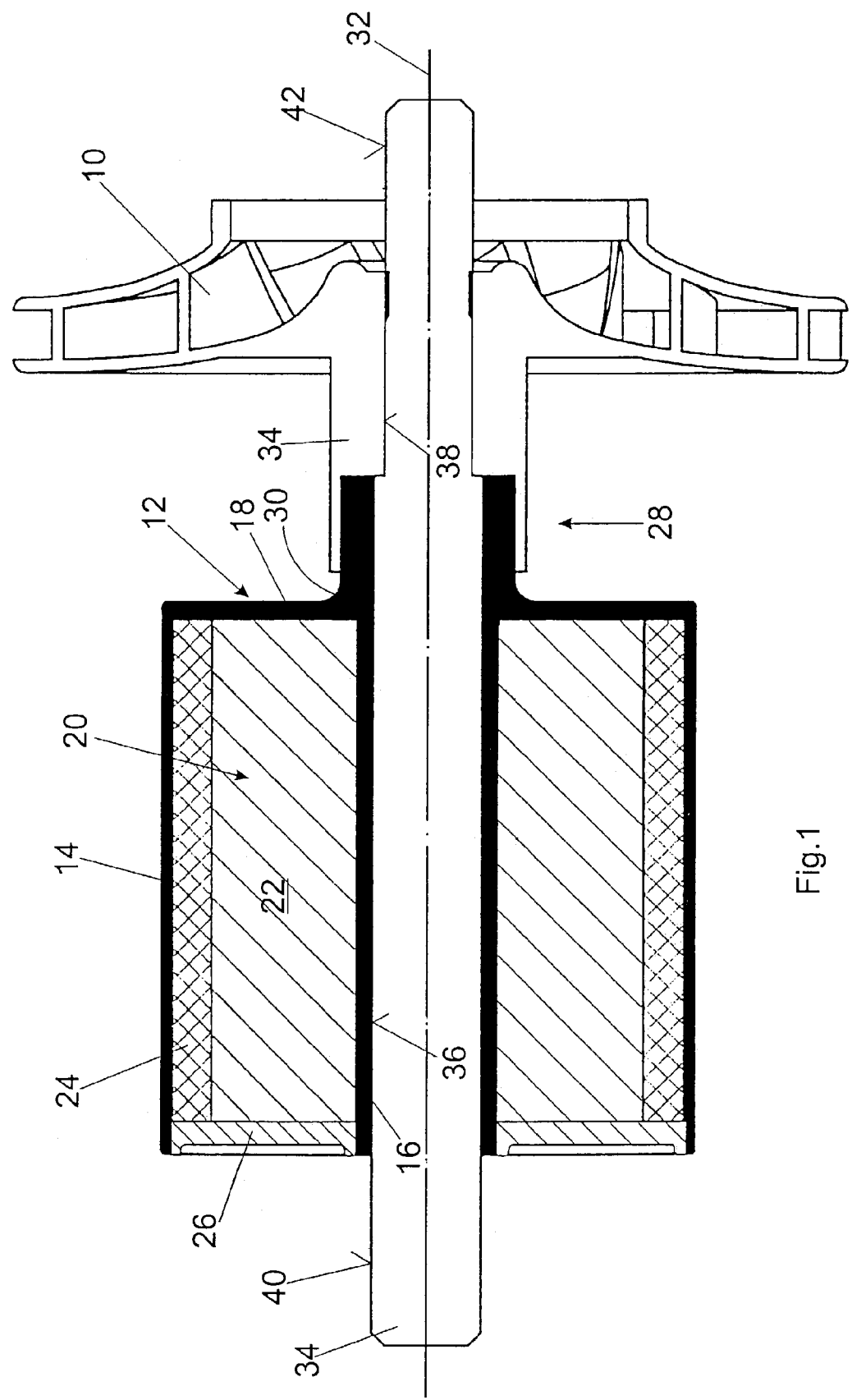
FIG. 1 shows a schematic side view of a first embodiment of the wet rotor-type pump according to the invention.

According to FIG. 1, in a pump impeller 10, which is e. g. made from plastic material, the fluid flows in e. g. from the right and is transported e. g. vertically to the inflow direction.

In the embodiments shown, a protective means 12 is of cup- or pot-like configuration and comprises an outer circular cylinder 14 and a circular cylinder 16 arranged concentrically to the former. Further, the protective means 12 comprises a disk-shaped bottom 18 which is connected with the two cylinders 14,16. Between the two cylinders 14,16 a circular ring-shaped hollow space 20 is formed in which a motor rotor is positioned which comprises a rotor body 22 arranged for carrying solenoids 24.

For installing the pump, the motor rotor 22,24 is inserted into the hollow space 20 of the pot-like protective means 12. To completely seal the motor rotor 22,24 towards the fluid flowing around the motor rotor 22,24 for cooling the latter, the hollow space 20 is closed with a ring-shaped disk or a cover 26. Said cover 26 can be pressed or glued into the hollow space 20. Further, it is possible to tightly close the hollow space by welding on the cover 26, e. g. by means of laser welding. Closing of the hollow space 20 can further be effected by two-component injection molding.

Since the protective means 12 and the disk 26 are preferably made from plastic material, said disk 26 can be welded to said protective means 12 for the purpose of sealing the hollow space 20. Alternatively, it is possible to injection-mold the disk or the cover 26 with the protective means 12 by means of a two-component injection molding process, thus sealing the hollow space 20.

For connecting the motor rotor 22,24, together with the protective means 12, with the pump impeller 10, a toothing 28 is provided. For this purpose the protective means 12 comprises a projection 30 having teeth and/or grooves which extend in longitudinal direction 32. The pump impeller 10 also comprises a cylindrical projection 34 having a toothing which is complementary to the toothing of the projection 30 such that the pump impeller 10 and/or the projection 34 of the pump impeller 10 can be pushed onto the projection 30 of the protective means 12. Thus a positive connection of the pump impeller 10 with the protective means 12 and/or the motor rotor 22,24 is realized.

The protective means 12 and thus the motor rotor 22,24 arranged in the hollow space 20 as well as the pump impeller 10 are carried by a bearing shaft 34. Said bearing shaft 34 extends through a through bore 36 of the protective means 12, which through bore 36 is defined by the hollow space 20. Said through bore 36 extends coaxially to the two cylinders 14,16 forming the hollow space 20. The pump impeller 10 and the projection 34 of the pump impeller 10 also comprise a through bore 38 through which extends the bearing shaft 34. Said bearing shaft 34 comprises bearing surfaces 40,42 which are arranged in the area of the two ends of the bearing shaft 34. Via the bearing surfaces 40,42 the bearing shaft 34 is supported, e. g. via sliding bearings, in the pump housing.

Figure 2:
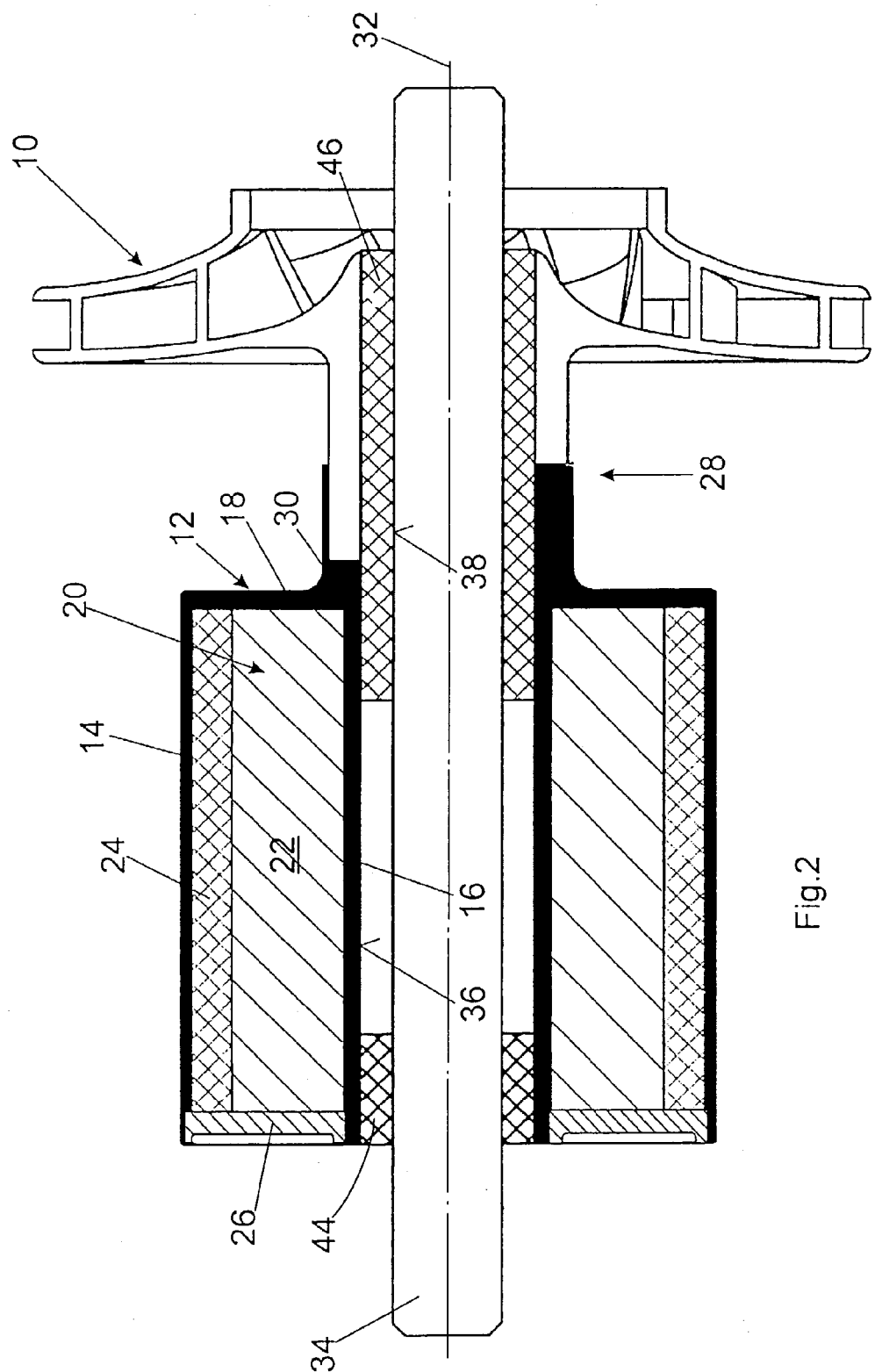
FIG. 2 shows a schematic side view of a second preferred embodiment of the wet rotor-type pump according to the invention.

In the second embodiment of the invention shown in FIG. 2 the same or similar components are designated by the same reference numerals.

The essential difference between the second embodiment and the first embodiment of the invention is that the bearing shaft 34 is fixedly arranged in the pump housing, i. e. said bearing shaft 34 does not rotate. Between the through bore 36 of the protective means 12 and the through bore 38 of the pump impeller 10 e. g. two sliding bearings 44,46 are arranged. Thus the protective means 12 rotates, together with the motor rotor 22,24 and the pump impeller which is connected with the protective means 12 via the toothing 28, about the stationary bearing shaft 34.

Although a preferred embodiment of the invention has been specifically illustrated and described herein, it is to be understood that minor variations may be made without departing from the spirit and scope of the invention, as defined in the appended claims.

What is claimed is:

1. A Wet motor-type pump for pumping coolants in vehicle motors, comprising:
   a pump impeller with an elongated central hub for feeding a fluid;
   a motor rotor connected with said pump impeller, said motor rotor being cooled by the fluid;
   a shaft for mounting said motor rotor and said pump impeller thereon;
   an outer hollow cylinder;
   an inner hollow cylinder concentric with said outer hollow cylinder for forming a ring-shaped hollow space for receiving said motor rotor; and
   a bottom connected with said inner and outer hollow cylinders so that said motor rotor is sealed towards the fluid, said inner hollow cylinder having an extension axially along said shaft such that at least a portion of said elongated central hub is positioned between said shaft and said extension.

2. Wet rotor-type pump according to claim 1, wherein said inner and outer hollow cylinders define an opening opposite said bottom so that said motor rotor is received in said ring-shaped hollow space.

3. Wet rotor-type pump according to claim 1, wherein said inner and outer hollow cylinders and said bottom are configured as a single piece.

* * * * *